J. FERRIS.
SURFACE CULTIVATOR.
APPLICATION FILED MAY 7, 1919.
1,353,992.
Patented Sept. 28, 1920.
2 SHEETS—SHEET 1.
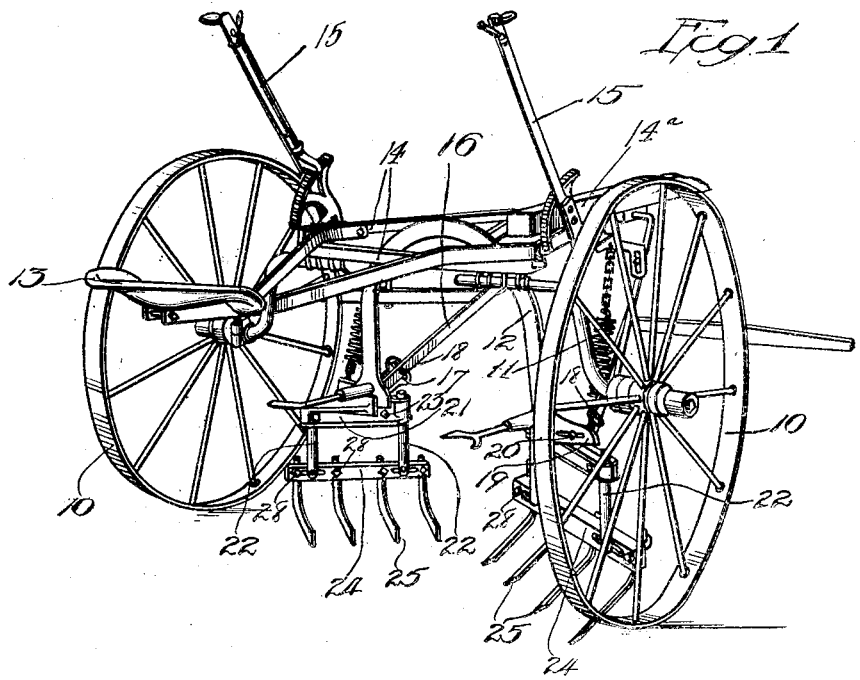
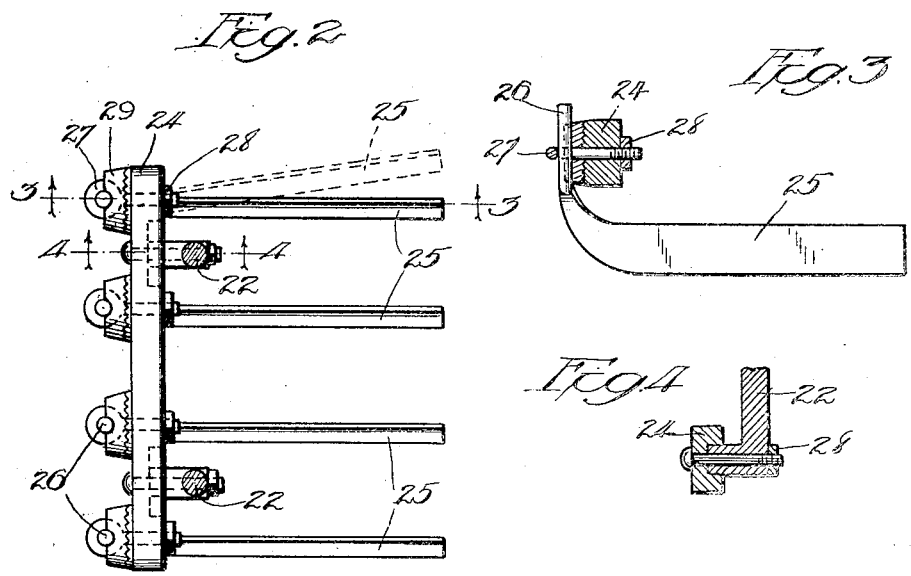
Witness:
Stephen F. Rebora
Inventor:
Joel Ferris
By Chas. E. Bulkley
Attys

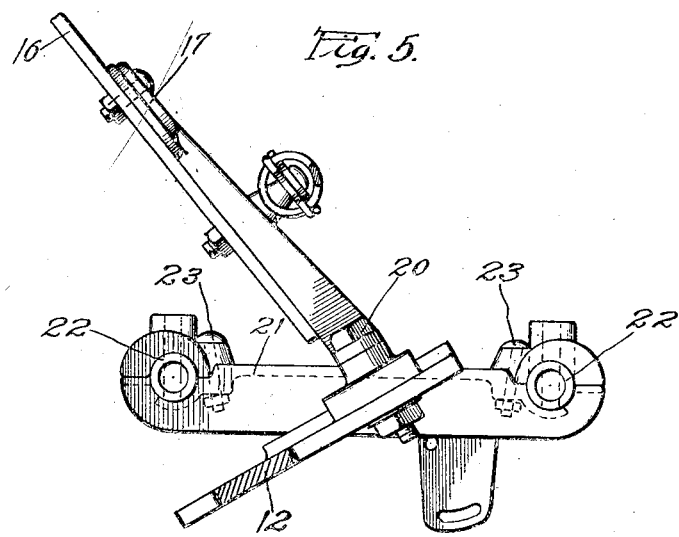
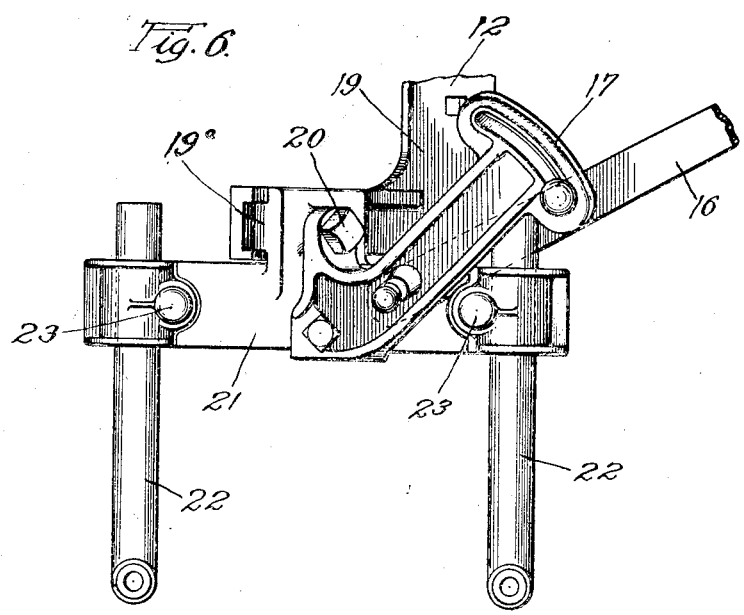

UNITED STATES PATENT OFFICE.

JOE FERRIS, OF MORRIS, ILLINOIS.

SURFACE CULTIVATOR.

1,353,992.　　　　Specification of Letters Patent.　　Patented Sept. 28, 1920.

Application filed May 7, 1919. Serial No. 295,421.

*To all whom it may concern:*

Be it known that I, JOE FERRIS, a subject of the King of Italy, and resident of Morris, Grundy county, Illinois, have invented a certain new and useful Improvement in Surface Cultivators, of which the following is a specification.

My invention relates to improvements in surface cultivators, and relates particularly to improved means for adjusting the cultivator blades to compensate for varying working conditions. My invention relates to a cultivator in which the cultivator blades are turned up at their front end—that is, are runner-shaped, in order to prevent weeds from becoming entangled on these blades, and thus impeding the operation of the machine. It is difficult, however, to cause such blades to properly enter the ground for cultivating purposes. If they are adjusted to properly operate under certain conditions of soil, they will not properly operate in slightly varying conditions. In order to cause such runner-shaped blades to properly operate, it is necessary that they be capable of ready and various adjustments, and the special object of my invention is to provide such varying adjustments for the blades.

These and other features and objects of my invention will be more readily understood by having reference to the accompanying drawings, in which I have illustrated one embodiment of my invention.

Figure 1 is a perspective view of a cultivator embodying my invention.

Fig. 2 is a plan view of one of the gangs of cultivator blades, showing the supporting rods in section.

Fig. 3 is a sectional view taken on the line 3—3 of Fig. 2, looking in the direction of the arrows.

Fig. 4 is a sectional view taken on the line 4—4 of Fig. 2, looking in the direction of the arrows.

Fig. 5 is a detail plan view of one of the cross heads which carry the cultivator blades, the arch being shown in section.

Fig. 6 is a detail front view of one of the cross heads showing the manner it is mounted on the lower end of the arch.

I have illustrated my invention in connection with a surface cultivator of the well-known type, consisting essentially of the ground wheels 10 mounted upon independent crank axles 11, carried by a triangular-shaped frame 14, to which frame, the driver's seat 13 and the tongue 14ª are secured. Mounted between the two wheels there is an arch 12, to the lower ends of which a yoke 16 is secured, the forward end of this yoke being pivotally connected to the tongue. In order to permit adjustment between the arch and this yoke, the arch is provided with forwardly extending arms 17 having slotted end portions and bolts 18 extend through these slots and the arms of the yoke 16, and then suitable clamping nuts are employed to firmly clamp the arms 17 to the yoke 16. By loosening the clamping nuts and permitting the arms 17 to pivot with respect to the arms of the yoke 16, the angular position of the arch with respect to the yoke 16, and thus with respect to the frame, may be varied. Mounted on the side members of the frame 14, there are a pair of hand-levers 15, through the medium of which the arch 12 can be raised or lowered to regulate the depth at which the cultivator blades carried by this arch, are supported. Mounted on the lower end of each arm of the arch, there is a laterally extending casting 19 having marginal flanges and fitted within this casting there is a second complementary casting 19ª secured thereto by a bolt 20, passing through a suitable slot in the casting 19. This casting 19ª carries a cross-head 21, to the opposite ends of which the supporting rods 22 are secured. This cross-head 21 is formed in two sections clamped together by the bolts 23, and the end portions of the casting are rounded to form circular bearing sockets for the rods 22. The lower end of these supporting rods is pivotally connected to a second cross-head 24, to which a gang of cultivator blades 25 are secured. These cultivator blades are runner-shaped—that is, their forward ends are curved upwardly and provided with a vertically extending end portion 26, which passes through the head of an eye-bolt 27, which eye-bolt passes through the cross-head 24, being held in position by the nut 28 on the opposite end of the bolt. Mounted on the eye-bolt, between the end 26 of the cultivator blade and the cross-head, there is a circular washer 29 having a circular groove on its outer surface to receive the end 26 of the runner. The opposite surface of this washer is provided with radial teeth which mesh with corresponding teeth on the surface of the cross-head. With this construction, it will be seen that by loosening the nut 28 on the eye-bolt the cultivator blade is free to pivot about its end 26 as a vertical axis; or, if the washer 29 is loosened from engagement with the cross-head, the blade may be flattened by adjusting it about a horizontal axis. Likewise, the individual blades may be slightly raised or lowered by varying the vertical position of the supporting end 26 of the corresponding eye-bolt. By loosening the clamping bolt 23 in the upper cross-head 21, one of the supporting rods may be moved vertically so as to raise one end of the gang of blades, so that the outer blades will cut deeper than the inner blades. Likewise, by reason of the slotted connection between the upper cross-head and the yoke, the gangs may be adjusted laterally of the line of travel to compensate for different widths of rows. If it is desired to tip the blades forwardly or backwardly, it is merely necessary to loosen the bolts 18 and thus adjust the slotted arms 17 with respect to the brace yoke 16, to thereby vary the angle of the arch with respect to the tongue.

It will thus be seen that I have devised a very efficient structure, in which the runner-shaped cultivator blades can be individually adjusted, or adjusted by gangs—that is, the individual runner blades can be angled or can be turned about a horizontal axis in order to flatten the same. Likewise, the gangs as a whole can be tilted either about a transverse or a longitudinal axis. By reason of this universal adjustment of the cultivator blades, I am enabled to cause them to properly operate under varying conditions and in different soils, and likewise obtain the advantages inherent in the runner-shaped blades in that they cut the weeds without danger of the same becoming entangled on the blades, and thus interfering with the operation of the machine.

While I have illustrated one particular embodiment of my invention, it will be understood that I do not wish to be limited to the exact construction shown and described, but that various changes and modifications will readily suggest themselves to those skilled in the art without departing from the spirit and intent of my invention.

What I claim as my invention is:

1. In a surface cultivator, a gang of cultivator blades consisting of a plurality of blades, means for adjustably supporting the forward ends of each of said blades, whereby they may be individually angled about a vertical axis or adjusted about a horizontal axis, and means for adjusting said gang as an entirety about a longitudinal axis.

2. In a surface cultivator, a gang of cultivator blades consisting of a plurality of blades, means for adjustably supporting the forward ends of each of said blades, whereby they may be angled about a vertical axis or adjusted about a horizontal axis, means for adjusting said gang about a longitudinal axis, and means for also adjusting said gang transversely of the machine.

3. In a surface cultivator, a gang of cultivator blades, a supporting end extending upwardly from the forward end of each blade, a cross-head for said gang, an eye-bolt passing through said cross-head and gripping the end of one of said blades, whereby the blade may be swung about a vertical axis, an adjustable washer on said eye-bolt for permitting the adjustment of said blade about a horizontal axis, and means for adjusting said gang as an entirety about a longitudinal axis.

4. In a surface cultivator, a gang of cultivator blades, a supporting end extending upwardly from the forward end of each blade, a cross-head for said gang, an eye-bolt passing through said cross-head and gripping the end of one of said blades, whereby the blade may be swung about a vertical axis, an adjustable washer on said eye-bolt for permitting the adjustment of said blade about a horizontal axis, and means for adjusting said gang about a longitudinal axis and also for adjusting said gang transversely of the machine.

Signed by me at Morris, Illinois, this 23 day of April, 1919.

JOE FERRIS.